United States Patent Office 3,298,841
Patented Jan. 17, 1967

3,298,841
BASIC REFRACTORY PARTICULARLY SUITED
FOR USE IN ROTARY KILN
Peter Harry Havranek, Pittsburgh, Pa., assignor to Harbison-Walker Refractories Company, Pittsburgh, Pa., a corporation of Pennsylvania
No Drawing. Filed Aug. 13, 1965, Ser. No. 479,636
6 Claims. (Cl. 106—58)

This invention is particularly directed to the manufacture of basic refractory shapes, both burned and unburned, which are suited for lining rotary kilns and the like. For example, the shapes have utility in fabricating the lining of rotary kilns of the type used in burning of clinker in the manufacture of cement such as Portland cement.

Higher firing temperatures are becoming increasingly evident in the commercial operation of cement kilns. These increased firing temperatures have led to a desired for an improved refractory for lining construction. Thus, it is an object of this invention to provide an improved basic refractory composition for use in lining rotary kilns or the like.

As contemporary workers are beginning to realize, the solution to problems caused by increased firing temperatures in rotary kilns is more than just providing a more refractory product, i.e. a product capable of withstanding higher firing temperatures. For example, brick of the type disclosed and claimed in U.S. Patent 3,180,744 have proved to be superior as far as refractoriness goes, but most distressing, these brick seem to be inert to the materials being treated in the kiln and thus do not take on a coating. This coating, which is in part a reaction product of material being heated and the refractory, is extremely important to the operation of rotary kilns in manufacture of cement. Not only does it assure a purer product, but it serves to protect the refractory from continued reaction, thereby lengthening the useful life of a kiln lining.

It was decided the best approach would be to fabricate synthetic clinker or grain which would provide both the desired refractoriness as well as ability to take on a coating of such as Portland cement. Brick made of the synthetic clinker, in addition to refractoriness and ability to take on a coating, would desirably have low porosity and be dimensionally stable at elevated temperatures. Some prior basic refractories used have had a shrinkage on the order of 4% which is considered by many to be unreasonable.

Briefly, according to this invention, there is provided a brick fabricated of synthetic grain analyzing from 88 to less than about 95% MgO and including lime and silica in a ratio greater than about 2:1. $Al_2O_3$ is desirably maintained below about 1% of the grain. There is additionaly provided from 1 to 3% of a reducible oxide or mixture thereof. The reducible oxide is added as a separate batch ingredient in the manufacture of the synthetic grain or clinker. By "reducible oxide" there is meant to describe an oxide which in the presence of carbon or other strong reducing agents can be reduced to native metal or a sub-oxide. By "reducing" it is meant an environment which will supply reactants which will wholly or in part remove oxygen from chemical combination with the oxide.

The lime-silica ratio is considered to be critical. There must always be present lime and silica in quantities sufficient to assure formation of refractory dicalcium silicate or tricalcium silicate. In a broader aspect, the brick of this invention, in addition to the synthetic grain just mentioned, include a minor but appreciable quantity of relatively coarse chrome ore. By relatively coarse it is meant on the order of $-6 +28$ mesh Tyler. Preferably, on the order of 10% by weight of the brick is this chrome ore.

In the laboratory a plurality of refractory shapes were made from various combinations of synthetic clinker grain. Three types were used having the following chemical analyses:

Table I

| | | A | B | C |
|---|---|---|---|---|
| Silica | $SiO_2$, percent | 9.9 | 5.1 | 1.8 |
| Alumina | $Al_2O_3$ | 4.4 | 1.2 | 0.5 |
| Iron Oxide | $Fe_2O_3$ | 7.7 | 5.3 | 1.5 |
| Chromic Oxide | $Cr_2O_3$ | 6.3 | | |
| Lime | $CaO$ | 19.1 | 15.5 | 5.1 |
| Magnesia | $MgO$ (by diff.) | 52.6 | 72.9 | 91.1 |
| Phosphorus | $P_2O_5$ | 0.6 | | |
| Lime/Silica Ratio | | 1.93/1 | 3.04/1 | 2.74/1 |

Grain C is synthetic grain used according to this invention. Grain A is indicative of a prior super product used in fabricating basic rotary kiln brick. Grain B is another synthetic grain used in studies leading to this invention.

Seven sets of test brick were made and subjected to comparative physical testing as reported in Table II.

Table II

| Brick Mix | 1 | 2 | 3 | 4 | 5 | 6 | 7 |
|---|---|---|---|---|---|---|---|
| Ratio B Magnesite Grain/C Magnesite Grain | 100/0 | 80/20 | 60/40 | 40/60 | 20/80 | 0/100 | [1] 100% |
| Percentage Magnesite Included | 90 | 90 | 90 | 90 | 90 | 90 | 90 |
| Philippine Chrome Ore $-6 +28$ Mesh, Percent | 10 | 10 | 10 | 10 | 10 | 10 | |
| Tempering Agent, Percent | 5½ | 5½ | 5½ | 5½ | 5½ | 5½ | 5½ |
| Burn, Temperature, ° F | 2,520 | 2,520 | 2,520 | 2,650 | 2,650 | 2,650 | [2] 2,500 |
| Bulk Density, p.c.f. | 178 | 178 | 177 | 183 | 184 | 184 | 174–180 |
| Apparent Porosity (Av. 3), Percent | 20.4 | 20.7 | 20.5 | 17.9 | 17.5 | 17.8 | 18.7–22.6 |
| Reheat 2,910° F. (1,600° C.) (Av. 3): | | | | | | | |
| Linear Change, Vertically, Percent | −3.6 | −3.2 | −2.5 | −1.4 | −0.7 | −0.5 | −3.9 |
| Volume Change | −14.6 | −12.3 | −9.5 | −5.0 | −2.3 | −1.8 | |
| Appearance After Reheat | Brick 1 to 3 showed decreasing amounts of sticking and brick distortion. | | | Brick 4 to 7 were essentially dry and free of distortion. | | | |

[1] Grain A.
[2] About.

The tempering agent was about a 50/50 weight mixture of lignin solids and a water carrier fluid. As can be seen from comparing brick 1 through 6, as the quantity of synthetic grain/C was increased, volume stability at elevated temperatures increased and porosity decreased. Bulk density increased. Some of the more desirable properties are, of course, the result of a higher firing temperature for brick 4 through 6; but brick 1–3 and 7 cannot be fired at the higher temperatures because they are not refractory enough. Comparing brick 1 through 3 with 4 through 6, one notes an unexpected jump in density as the special grain moves from a minority to a majority of the brick mix. A similarly most surprising change occurs in porosity, i.e. brick 1 through 3 have porosities of over 20% and brick 4 through 6 (in which the major portion of the magnesite grain is the desired synthetic magnesite clinker) have porosities of less than 18%. An even more interesting aspect of these tests, however, is the volume change. Not until the preferred synthetic magnesite clinker constituted 80 of the 100 parts of the clinker added does shrinkage in reheat tests come down to a reasonable range.

Additional test brick of brick mixes 1 through 7 were formed into shapes and fired as indicated in Table II to recover shapes having properties substantially as indicated in Table II. The test shapes were approximately 9 x 4½ x 3 inches and these were cut in half to provide about 4½ x 4½ x 3 inch test specimens. Pockets were formed in a 4½ x 4½ inch face of each specimen and 130 grams of Portland cement were deposited in each of the pockets. These specimens, carrying the cement, were subjected to a 2,910° F. burn. Specimens of shapes of brick mixes 1 through 5 showed adherence of cement discs but these discs could easily be broken off by firm pressure. Specimens of brick mixes 6 and 7 (7 being comparable to a good prior commercial product) had cement discs stuck firmly to them which discs could not easily be removed.

While all of the test mixes have shown a 10% addition of chrome ore, a satisfactory range is 0–20%. Good brick are obtained without any chrome ore but it is preferred to add some since it improves the thermal shock resistance of the brick. The upper limit is controlled by the lime-silica ratio which is considered so critical to this invention. The chrome ore inherently adds $SiO_2$ to the system which must be balanced by CaO in the clinker. The lime-silica ratio of the brick batch is controlled at as close to 2:1 as possible to ensure formation of refractory dicalcium silicate.

All of the brick and/or specimens of all of the tests were made from batches having an overall size gradation approximately as follows:

| | Percent |
|---|---|
| —4 +10 mesh | About 50 |
| —10 +28 mesh | About 20 |

The remainder of 30% being —65 mesh.

The —65 mesh material is referred to as "ball mill fines" and nominally includes on the order of 50 to 60% —325 mesh material. As noted above, the chrome ore was —6 +28 mesh. The remainder of the —4 +28 mesh fraction of the batch was magnesite clinker.

While there is mention of ball mill fines as including 50 to 60% —325 mesh material, 40 to 60% is a satisfactory range. Further, while a brick which is 90% the special grain and 10% chrome ore is preferred, brick such as brick 5 of Table II are considered satisfactory. Thus, broadly, brick according to this invention are comprised of 10 parts, by weight, of coarser size graded chrome ore and 90 parts, by weight, of dead burned magnesite. From 80 to 100% of the magnesite is the special clinker, clinker C in Table I.

The foregoing testing substantiates that brick according to the persent invention are denser and more volume stable than prior commercially used basic refractories for lining rotary kilns. The brick have comparable or better density and have proved more able to resist contemporary high temperatures used in operating rotary kilns for the production of cement.

While the foregoing description has been directed to burned brick, it should be understood this invention is equally applicable to unburned brick.

Having thus described the invention in detail and with sufficient particularity as to enable those skilled in the art to practice it, what is desired to have protected by Letters Patent is set forth in the following claims.

I claim:
1. A basic refractory shape made from batch consisting essentially of 0 to 20 parts, by weight, of chrome ore and 80 to 100 parts by weight of magnesite, from 80 to 100% of said magnesite being synthetic grain, said synthetic grain by weight and on the basis of an oxide analysis analyzing as follows:

| | Percent |
|---|---|
| MgO | 88–95 |
| Reducible oxide or mixtures thereof | 1–3 |
| $Al_2O_3$ | Less than about 1 | and there being both CaO and $SiO_2$ present, said CaO and $SiO_2$ being in a weight ratio exceeding 2:1 to assure formation of refractory dicalcium silicate or tricalcium silicate.

2. A burned brick of the composition of claim 1.
3. An unburned brick of the composition of claim 1.
4. The brick of claim 1 in which said chrome ore constitutes 10%, by weight, of the batch from which the brick are made.
5. That method of fabricating a burned basic refractory rotary kiln brick having the ability to take on a coating when a kiln in which it is used is burning Portland cement or the like, comprising the steps of fabricating a basic refractory brickmaking size-graded batch, said batch consisting essentially of 0 to 20 parts, by weight, of chrome ore and 80 to 100 parts, by weight, of magnesite, from 80 to 100% of said magnesite being synthetic magnesite grain, said synthetic magnesite grain, by weight and on the basis of an oxide analysis, analyzing as follows:

| | Percent |
|---|---|
| MgO | 88–95 |
| Reducible oxide or mixtures thereof | 1–3 |
| $Al_2O_3$ | Less than about 1 | and there being both CaO and $SiO_2$ present, said CaO and $SiO_2$ being in a weight ratio exceeding 2:1 to assure formation of refractory dicalcium silicate or tricalcium silicate, forming said batch into shapes, burning said shapes, recovering the burned shapes.

6. The method of claim 5 in which said synthetic magnesite grain has a chemical analysis substantially as follows:

| | Percent |
|---|---|
| Silica ($SiO_2$) | 1.8 |
| Alumina ($Al_2O_3$) | 0.5 |
| Iron oxide ($Fe_2O_3$) | 1.5 |
| Chromic oxide ($Cr_2O_3$) | --- |
| Lime (CaO) | 5.1 |
| Magnesia (MgO) (by diff.) | 91.1 |

Lime/silica ratio, 2.74/1.

References Cited by the Examiner

UNITED STATES PATENTS

| 2,079,066 | 5/1937 | Hartmann | 106—59 |
| 3,222,196 | 12/1965 | Davies et al. | 106—58 |

HELEN M. McCARTHY, *Acting Primary Examiner.*

TOBIAS E. LEVOW, J. E. POER, *Assistant Examiners.*